United States Patent [19]

Weiss et al.

[11] Patent Number: 5,416,327
[45] Date of Patent: May 16, 1995

[54] ULTRAFAST SCANNING PROBE MICROSCOPY

[75] Inventors: Shimon Weiss, El Cerrito; Daniel S. Chemla, Kensington; D. Frank Ogletree, El Cerrito; David Botkin, San Francisco, all of Calif.

[73] Assignee: Regents of the University of California, Oakland, Calif.

[21] Appl. No.: 145,993

[22] Filed: Oct. 29, 1993

[51] Int. Cl.6 .............................. H01J 37/00
[52] U.S. Cl. ..................... 250/307; 250/306
[58] Field of Search ............. 250/306, 307, 423 F

[56] References Cited

U.S. PATENT DOCUMENTS

| | | | |
|---|---|---|---|
| 4,921,346 | 5/1990 | Tokumoto et al. | 250/306 |
| 5,060,248 | 10/1991 | Dumoulin | 250/306 |
| 5,144,833 | 9/1992 | Amer et al. | 250/306 |
| 5,196,701 | 3/1993 | Foster et al. | 250/306 |
| 5,262,642 | 11/1993 | Wessels et al. | 250/306 |
| 5,294,804 | 3/1994 | Kajimura | 250/306 |

OTHER PUBLICATIONS

"Ultrafast Scanning Probe Microscopy" by S. Weiss, D. Botkin, D. F. Ogletree, M. Salmeron and D. S. Chemla. Paper presented at the optical Microwave Interaction Conference held in Santa Barbara, Calif. in Jul. 1993.
"Ultrafast Scanning Microscopy" authored by S. Weiss, D. Botkin and D. S. Chemla. Presented at Optical Society of American Conference held in San Francisco, Calif. in Jan. 1993.
"Ultrafast Scanning Probe Microscopy" paper submitted to Applied Physics Letters accepted for publication, not yet published, authored by S. Weiss, D. F. Ogletree, D. Botkin, M. Salmeron and D. S. Chemla.
"Towards Ultrafast Movies of Moving Atoms" paper submitted to Optics and Photonics News, accepted for publication, not yet published, authored by S. Weiss, D. Botkin, D. F. Ogletree, M. Salmeron and D. S. Chemla.

Primary Examiner—Bruce C. Anderson
Attorney, Agent, or Firm—Paul R. Martin; Kathleen S. Moss; Pepi Ross

[57] ABSTRACT

An ultrafast scanning probe microscopy method for achieving subpicosecond-temporal resolution and submicron-spatial resolution of an observation sample. In one embodiment of the present claimed invention, a single short optical pulse is generated and is split into first and second pulses. One of the pulses is delayed using variable time delay means. The first pulse is then directed at an observation sample located proximate to the probe of a scanning probe microscope. The scanning probe microscope produces probe-sample signals indicative of the response of the probe to characteristics of the sample. The second pulse is used to modulate the probe of the scanning probe microscope. The time delay between the first and second pulses is then varied. The probe-sample response signal is recorded at each of the various time delays created between the first and second pulses. The probe-sample response signal is then plotted as a function of time delay to produce a cross-correlation of the probe sample response. In so doing, the present invention provides simultaneous sub-picosecond-temporal resolution and submicron-spatial resolution of the sample.

34 Claims, 4 Drawing Sheets

ULTRAFAST SCANNING PROBE MICROSCOPY

GOVERNMENT RIGHTS

The United States Government has rights in this invention pursuant to Contract No. DE-AC03-76SF00098 between the United States Department of Energy and the University of California.

TECHNICAL FIELD

The present invention relates to the field of microscopy and, more specifically, to ultrafast and scanning probe microscopy methods.

BACKGROUND OF THE INVENTION

Within the last decade, powerful scanning microscopy techniques which can achieve atomic resolution have been developed. These techniques include several types of Scanning Probe Microscopy (SPM) such as Scanning Tunneling Microscopy (STM), Scanning Force Microscopy (SFM) and Near-field Scanning Optical Microscopy (NSOM). In these SPM techniques, an atomically sharp probe (or a very small aperture in the case of NSOM) of a scanning probe microscope is scanned very close to or in contact with the surface of a sample. Typically, the probe is disposed, for example, a few angstroms from the surface of the sample. Due to the close proximity of the probe to the sample, different interactions or coupling mechanisms can occur between the probe and the sample. These interactions or coupling mechanisms include the generation of tunneling current between the sample and the probe, forces acting on the probe and the sample, and evanescent (or propagating) light wave coupling. The strength of these interactions is a very nonlinear function of the distance of the probe from the surface of the sample. Thus, this nonlinearity provides the means for atomic-scale control of the distance of the probe from the sample. Additionally, in SPM the nonlinearity allows for high spatial resolution of the sample limited by the sharpness of the probe of the scanning probe microscope.

As an example of such SPM techniques, in STM an image of the surface of the sample is achieved by collecting the tunneling current between the probe and the sample while scanning the probe over the surface of the sample. The tunneling current reflects the local density of states of the electrons at the Fermi level close to the surface of the sample. This information is then used to "map-out" the surface of the sample. In the case of SFM, an image of the surface of the sample is obtained by measuring the minute deflection of a cantilever on which the probe is mounted. That is, as the probe is scanned over the surface of the sample, forces such as electrostatic and magnetic forces, inter-atomic forces, and Van der Waals forces in turn exert forces onto the probe and the cantilever. The forces exerted on the probe cause minute deflection of the cantilever. These deflections are measured and used to map the surface of the sample. An NSOM image of the sample, on the other hand, is obtained by evanescent wave coupling to a sub-wavelength sized aperture of the scanning probe microscope.

Although these techniques have revolutionized the field of surface science, by providing spatial resolution on the atomic level, (or below the optical wavelength for NSOM) the time or temporal resolution of SPM techniques is limited by the scanning rate or speed of the scanning probe microscope and by the data acquisition electronics used in the scanning probe microscope. As a result, SPM techniques are generally limited to temporal resolution on the order of milliseconds for point measurements, and on the order of seconds for imaging.

Ultrafast time-resolved laser microscopy techniques have also been developed which can provide information about the surface of a sample with temporal resolution limited by the duration, or pulse width, of a short laser pulse. However, although such Ultrafast laser microscopy systems can provide temporal resolution on the order of a few femtoseconds, the spatial resolution of such systems is limited by the diffraction limit of the laser light. As a result, Ultrafast laser microscopy systems are limited to spatial resolution on the order of about a few microns for visible light. Furthermore, these techniques are not directly surface sensitive. The depth resolution of these techniques is limited to the smaller of the diffraction limit or the absorption length for light in the material under investigation.

However, in order to investigate the phenomena that govern the physics of certain mesoscopic and atomic systems and for characterizing the operation of submicron electronic and optoelectronic devices, it is necessary to simultaneously have high spatial resolution and high temporal resolution. For example, in processes such as carrier transport in mesoscopic structures, electric field and voltage wavefront propagation at metal semiconductor interfaces, and light emission in quantum confined structures, variations of interest occur over length scales much smaller than a few microns. Furthermore, due to high propagation velocities, excitations in materials to be observed may occur on a time scale well into the sub-picosecond domain. For example, electronic velocity in semiconductors and metals is on the order of approximately 1-10 angstroms per femtosecond, while voltage wave fronts propagate on high speed transmission lines at velocities on the order of approximately 1000 angstroms per femtosecond. Therefore, the spatial resolution of Ultrafast laser microscopy techniques is inadequate for studying such mesoscopic phenomena, and the temporal resolution of SPM techniques are inadequate for observing such high speed phenomena.

Consequently, as the technological demands for microscopy techniques increase, a need exists for a new microscopy technique to produce high spatial resolution and high temporal resolution simultaneously.

SUMMARY OF THE INVENTION

I t is therefore an object of the present invention to provide an improved microscopy method having simultaneous subpicosecond-time resolution and submicron-spatial resolution. This object has been accomplished by modulating both the probe of a scanning probe microscope and a sample with short optical pulses with a variable time delay between them. Because of the nonlinear nature of the probe to sample response, the probe-sample response signal can be measured over a range of differing time delays to obtain a cross-correlation of the probe-sample response signal. After characterizing the response of the probe alone, the dynamics of the sample are obtained by deconvolution, such that simultaneous spatial and temporal resolutions are achieved which are well below 1 micron and on the order of 1 picosecond, respectively.

In one embodiment of the present invention, a scanning tunneling microscope is used to determine the characteristics of a sample. The probe of the scanning tunneling microscope and the sample are modulated using two short optical pulses generated by a mode locked laser. A time delay was introduced between the two short optical pulses using an optical delay circuit. In this embodiment, the tunneling current between the probe of the scanning tunneling microscope and the sample was recorded. The probe-sample tunneling current response signal was then measured over a range of time delays between the two short pulses to obtain a cross-correlation of the probe-sample tunneling current response signal.

In other embodiments of the present claimed invention, alternate scanning probe microscopy (SPM) techniques are used. These include such well known (SPM) techniques as scanning force microscopy and near-field optical scanning microscopy.

In so doing, the present claimed invention is able to provide an improved microscopy method having simultaneous subpicosecond-time resolution and submicron-spatial resolution.

BRIEF DESCRIPTION OF THE DRAWINGS

The accompanying drawings which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
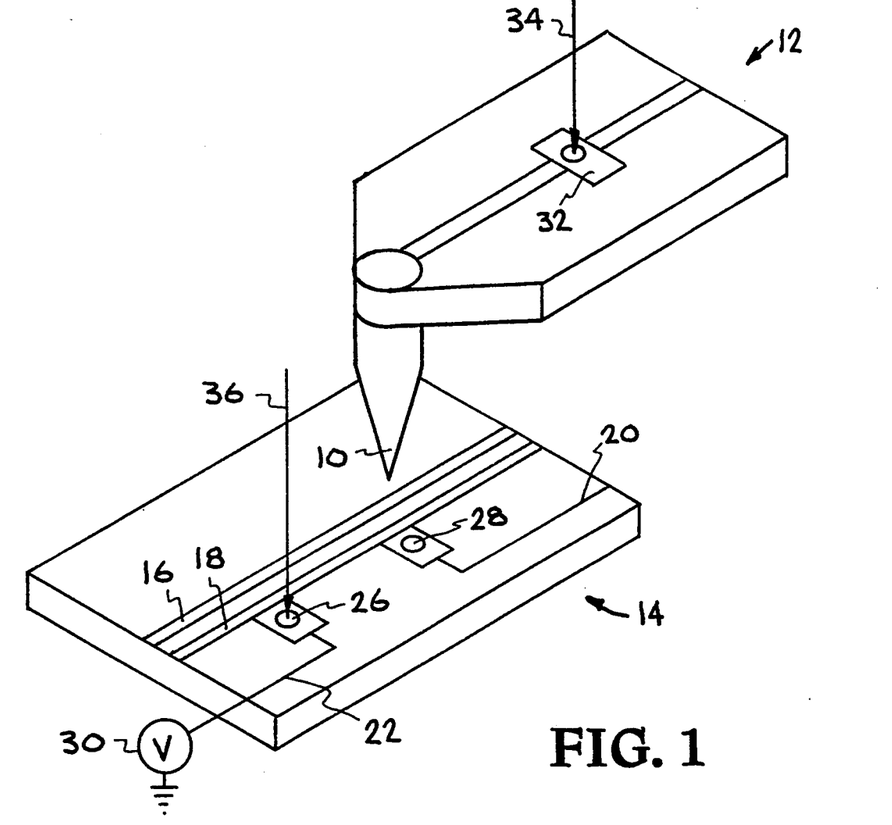
FIG. 1 is a perspective view of a probe and a probe switch assembly of a scanning tunneling microscope and two short optical pulses with the probe in close proximity to a transmission line of a sample in accordance with the present claimed invention.

With reference now to FIG. 1, a perspective view of a probe 10 and probe switch assembly 12 of a scanning probe microscope, not shown, and a sample 14 is shown. In the present embodiment, the scanning probe microscope is comprised of a scanning tunneling microscope. However, the methods of the present claimed invention are also well suited to the use of other well known scanning probe microscopes. The sample of the present embodiment is comprised of an ultrafast silicon on sapphire semiconductor structure. Sample 14 contains a transmission line consisting of two 10 micron wide Cr/Al/Au electrically conductive strips 16 and 18 deposited onto a sapphire substrate and separated by a 20 micron gap. Strip 16 is biased by scanning tunneling microscope electronics, not shown, with a voltage of approximately 10-100 millivolts. Strip 18 is grounded. Additionally, the sapphire substrate has two side pads 20 and 22 having photoconductive switches 26 and 28 disposed thereon. One of the side pads 22 is connected to a voltage source 30 which provides a voltage of, for example, 27 volts to excite a voltage pulse on the transmission line. Although the present embodiment, the present claimed invention is also well suited to numerous variations which will be obvious to those of ordinary skill in the art.

With reference still to FIG. 1, probe 10 of the scanning tunneling microscope, not shown, is positioned over strip 16 approximately 50-100 microns from switch 28. Probe switch assembly 12 of the scanning tunneling microscope has a probe switch 32 integrated therewith. Switch 32, like switches 26 and 28, is photoconductive. Specifically, switch 32 is fabricated from silicon on sapphire, and consists of a single 60 micron wide Cr/Au line with a 3 micron wide silicon gap. Probe 10 is formed of a 500 micron long brass wire having a diameter of 50 microns. Probe 10 is attached to the sapphire substrate and probe switch assembly 12 at one end using conductive epoxy. The other end of probe switch assembly 12 is attached to scanning tunneling microscope electronics, not shown, through a current preamplifier, not shown. Although such a probe is set forth in great detail in the present embodiment, the methods of the present claimed invention are also well suited to any of the numerous other types of scanning probe microscopy probes and probe switch assemblies well known in the art.

Referring still to FIG. 1, a mode locked titanium/sapphire laser, not shown, is used to generate a short laser pulse having a duration on the order of 100 femtoseconds. Although a titanium/sapphire laser is used in the present embodiment of the invention, the present claimed invention is also well suited to the use of other short optical and electromagnetic pulse generation means well known in the art. The laser pulse is then split to produce two short pulses shown as 34 and 36, and a variable time delay is introduced between two short optical pulses 32 and 34. Short optical pulse 36 is directed at sample 14, as shown in FIG. 1, to excite a transient voltage pulse on the transmission line of sample 14. Second short optical pulse 34 is directed at gate probe switch assembly 12, as shown in FIG. 1, to gate probe switch assembly 12. The probe to sample tunneling current is then measured using scanning tunneling microscope electronics, not shown, as the time delay between short optical pulses 34 and 36 is varied.

Figure 2:
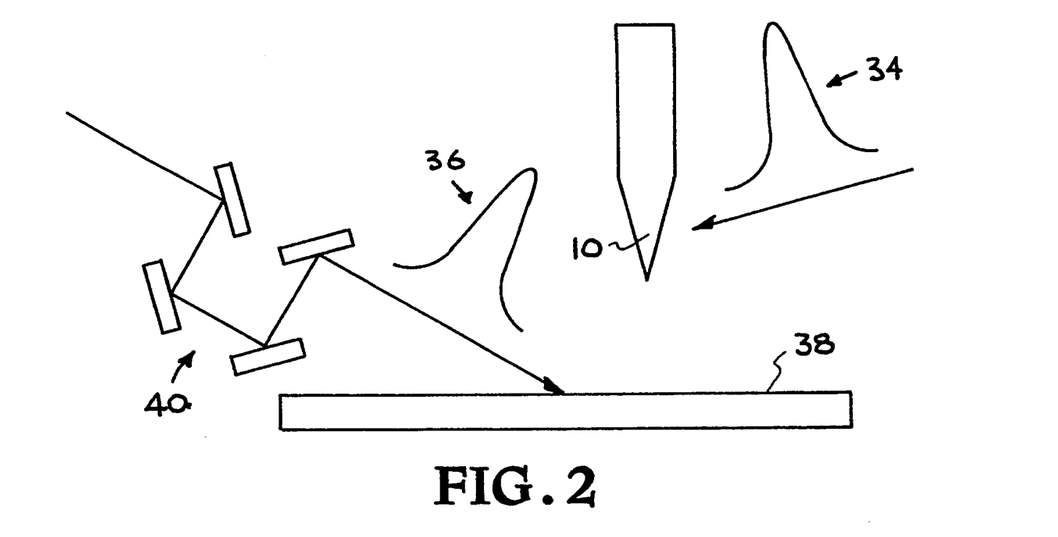
FIG. 2 is an enlarged view of a probe of a scanning probe microscope and two short optical pulses in accordance with the present claimed invention.

With reference now to FIG. 2, another embodiment of the present claimed invention is shown in which the probe 10 of a scanning probe microscope is modulated by directly impacting probe 10 with a short optical pulse 34. Additionally, in the embodiment of FIG. 2, the sample 38 is also directly impacted by another short optical pulse 36 as shown in FIG. 2. An optical time delay circuit schematically shown as 40 introduces a variable time delay between the two pulses 34 and 36. Thus, although a photoconductive switch 32 of FIG. 1 is used in combination with short optical pulse 34 of FIG. 1 to gate or modulate probe 10 in the embodiment of FIG. 1, the present invention also allows for alternate probe-sample modulation techniques. Furthermore, although the present embodiment as set forth in FIG. 2 shows a specific type of probe-sample excitation and modulation, the present claimed invention is also well suited to numerous other types and combinations of excitations and gating of the probe. For example, the excitation and gating mechanisms can be directly optical, or converted to electrical excitation, the excitation can be sound waves, vibrational modes, or any of numerous other means known in the art.

In addition to the numerous excitation techniques which can be used in accordance with the present claimed invention, the present invention also allows for variations in the position of the excitation of the sample and the gating of the probe with respect to the point where the probe and the sample interact. That is, the present claimed invention is also well suited to instances in which the sample is excited at a position remote from the position where the probe-sample response occurs. When the excitation is remote from the probe-sample interaction point, there is some wave phenomena whereby the excitation propagates towards the probe-sample interaction point. When the gating of the probe is remote from the probe-sample interaction point, the signal then propagates towards the gating point. Also, the excitation of the sample can be done with a separate probe. In such a case, one probe functions as an excitation probe, and the other probe functions as a detecting probe. Furthermore, the same concept can even be combined into a single probe which will provide both for excitation and gating using only a single probe. In so doing, the probing of a sample may be done with a stand-alone probe.

With reference again to FIG. 1, as the time delay between short optical pulses is changed, probe-sample tunneling current is measured as a signal. By changing the time delay and measuring the signal as a function of various delay times, a cross-correlation of the probe-sample tunneling current signal is obtained.

Figure 3:
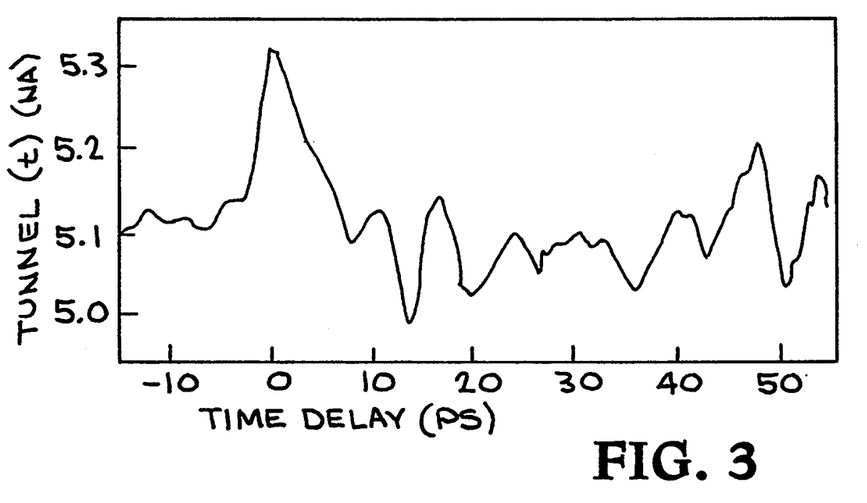
FIG. 3 is a plot of a time resolved current cross correlation in accordance with the present claimed invention.

Referring now to FIG. 3, a plot of a cross correlation pulse is shown having tunneling current on the y-axis and time delay between two short optical pulses 34 and 36 on the x-axis. The size of the cross-correlation pulse is approximately proportional to the D.C. tunneling current. The plot of FIG. 3 shows a 4.5 picosecond wide cross-correlation pulse which was detected by the scanning tunneling microscope while tunneling at 5 nanoamperes with a +80 millivolt bias on strip 16. As can be seen from the plot of FIG. 3, the average tunneling current cross correlation is increased by approximately 0.25 nanoamperes when the transient voltage pulse on the transmission line passes directly beneath probe 10 of FIG. 1. That is, when the time delay between short optical pulses 34 and 36 is at zero picoseconds, a peak in the correlation pulse is obtained. This rise in tunneling current of approximately 0.25 nanoamperes corresponds to a signal-to-background ratio of $\Delta I/I = 5\%$.

With reference still to FIG. 3, additional structure in the plot are attributed to ringing of probe 10 of FIG. 1. However, the large feature shown at a time delay of approximately 47 picoseconds is attributed to reflection of the transient voltage pulse from the end of the transmission line of FIG. 1. Furthermore, it has been determined that when probe 10 of FIG. 1 is withdrawn from the surface of sample 14 of FIG. 1 by a distance of greater than approximately 50 angstroms, both the tunneling and the cross-correlation signal will drop to zero.

Figure 4:
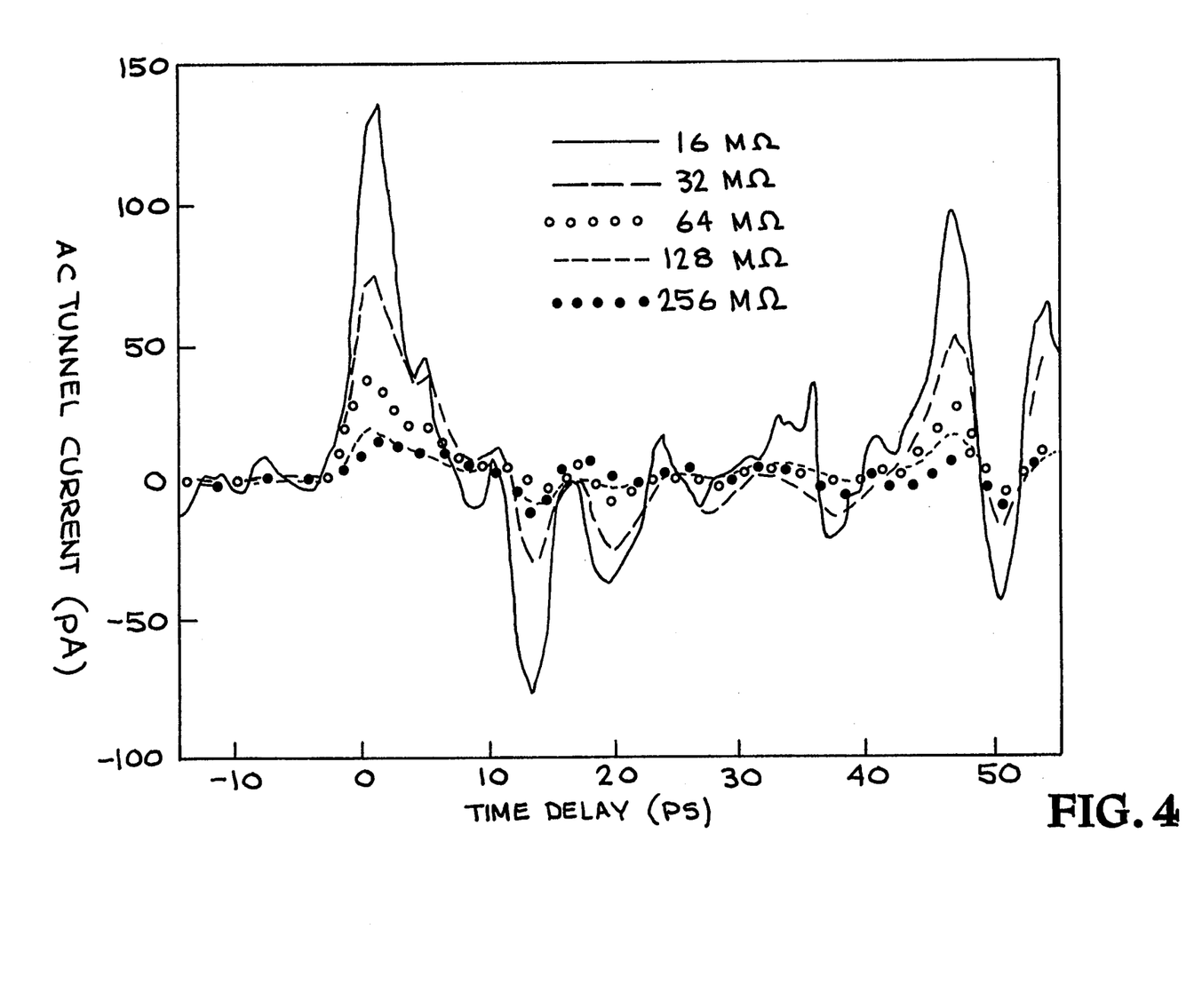
FIG. 4 shows plots of the tunnel current of a transmission line in accordance with the present claimed invention.

With reference next to FIG. 4, a series of plot of cross-correlations is shown. The plots of FIG. 4 were recorded at tunneling gap resistances from 16 megaohms to 256 megaohms with a +80 millivolt bias on strip 16 of FIG. 1. For clarity, only the changes $\Delta I(\Delta t)$ relative to the average tunnel current are shown. The height of the correlation peak in each plot is approximately proportional to the average tunnel current I. As can be seen from the plots of FIGS. 3 and 4, the temporal resolution of the present claimed invention can be on the order of picoseconds.

Figure 5:
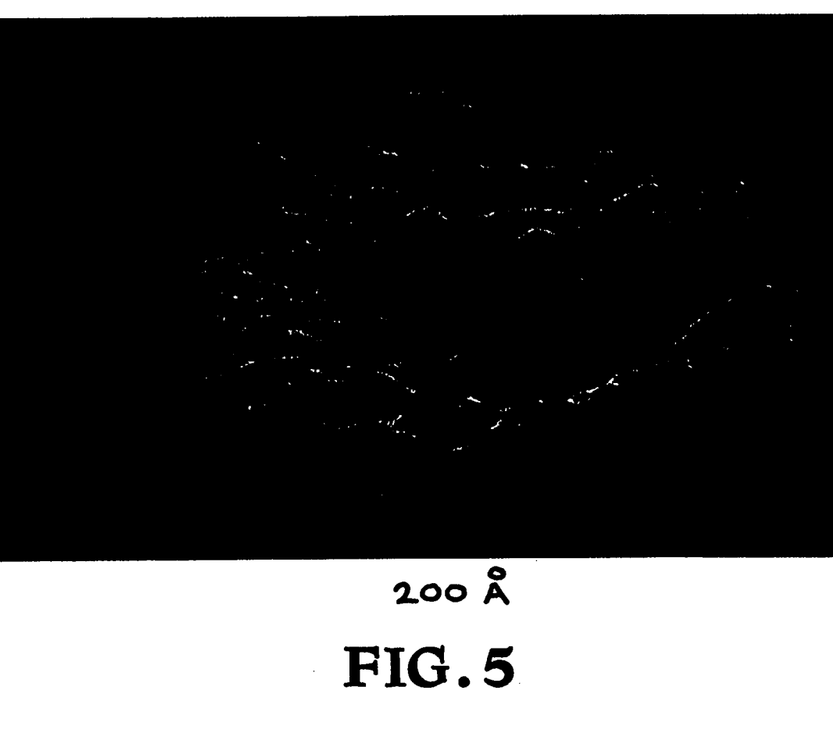
FIG. 5 is a topographic image of a transmission line in accordance with the present claimed invention.

With reference now to FIG. 5, a topographic image of the transmission line of sample 14 of FIG. 1 is shown at a time delay of zero seconds. By exploiting the non-linear nature of the probe-sample response signal, tunneling current in the present embodiment, the present claimed invention is able to achieve temporal resolution on the order of a few picoseconds. Thus, the present claimed invention shows a 9 orders of magnitude improvement in temporal resolution over prior art scanning probe microscopes. Additionally, the present embodiment of the present claimed invention allows for such improved temporal resolution while simultaneously having spatial resolution on the order of 50 angstroms. With minor modifications to the design, lateral spatial resolution on the order of 1 angstrom can be achieved as with a conventional scanning tunneling microscope. Therefore, by taking multiple "pictures" as shown in FIG. 5, for different time delays, the present claimed invention can be used to "make movies" of dynamical phenomena in real space with atomic resolution. Such a tool will open a window for the observation of processes and excitations which propagate at velocities of a few angstroms per femtosecond or less. Thus, the present invention will provide numerous benefits over the prior art. The present claimed invention will make it possible to spatially and temporally resolve phenomena such as vibronic motion on the atomic scale, charge transport in semiconductor structures, molecular activity, chemical reactions, and electric field and voltage wavefront propagation at metal semiconductor interfaces. The operation of submicron electronic/optoelectronic devices can be directly characterized with such a technique. Additionally, the present claimed invention can be used to address the hotly debated issue of "tunneling time." A very useful application of the present invention is high speed characterization of sub-micron line-width integrated-circuits.

The methods of the present claimed invention are not limited to scanning tunneling microscopy. The nonlinear nature of the probe-sample interactions in other scanning probe microscopy (SPM) techniques allows the present claimed invention to employ other (SPM) techniques such as scanning force microscopy and near-field optical scanning microscopy.

Figure 6:
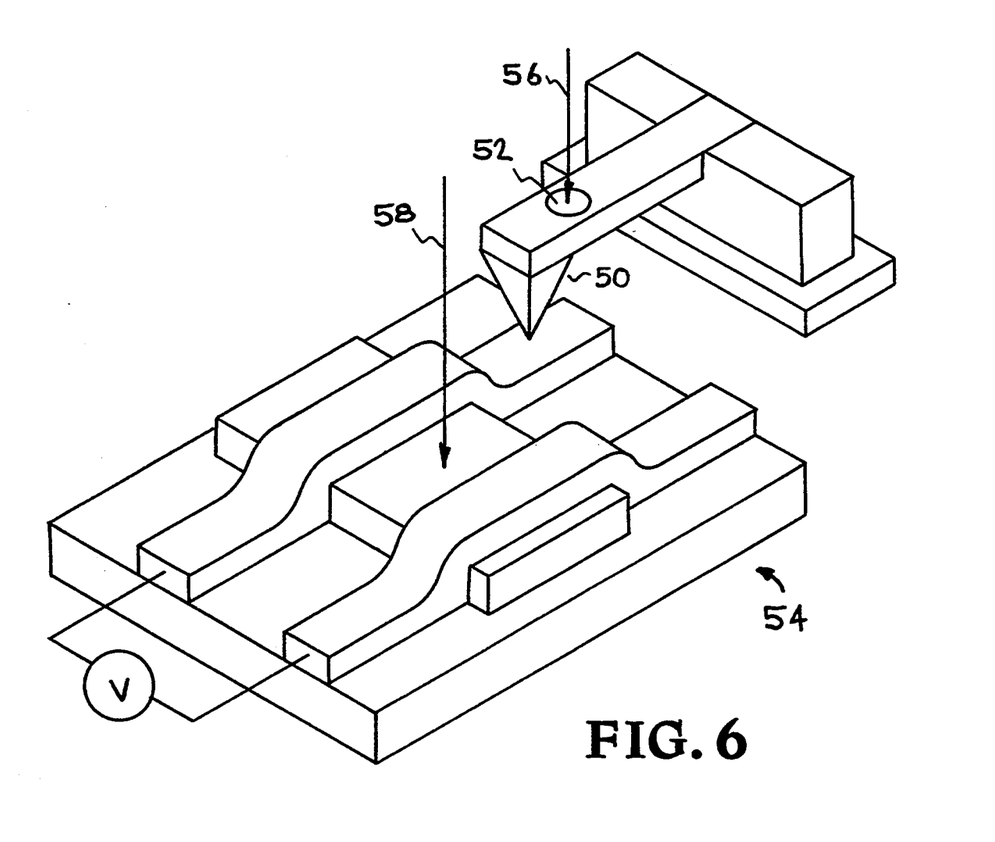
FIG. 6 is a perspective view of a probe and a probe switch assembly of a scanning force microscope and two short optical pulses with the probe in close proximity to a transmission line of a sample in accordance with the present claimed invention.

With reference now to FIG. 6, an embodiment of the present claimed invention employing a scanning force microscope is shown. As in the previous embodiment of the present claimed invention, a probe 50 of a scanning force microscope is modulated using a photoconductive switch 52, in combination with a short optical pulse 56. A transmission line on the sample 54 is modulated using a second short optical pulse 58. A variable time delay is also present between the first and second pulses. In the present embodiment, the scanning force microscope measures the electrostatic force (Coulomb interaction) exerted on probe 50 by the electrical charge or voltage deposited onto sample 54.

With reference still to FIG. 6, the scanning force microscope acts as a nonlinear cross-correlator such that simultaneous subpicosecond-time resolution and submicronspatial resolution are achieved. That is, probe 50 of the scanning force microscope is mounted on a cantilever which is micro-machined from a photoconducting substrate. The cantilever acts as a slow detector which cross-correlates the dynamic responses of sample 54 and probe 50. Its deflection (as a function of the time delay between short optical pulses 56 and 58) provides information on the dynamics of the device.

Referring still to FIG. 6, the electrostatic force acting on probe 50 of the scanning force microscope can be modeled as the force acting on a plane-parallel capacitor. The equation of motion for cantilever attached probe 50 is given by:

$$m\ddot{x} + \gamma \dot{x} + k x = \frac{\epsilon_0 A}{2z^2} V(t)^2 \quad (1)$$

where x is the deviation of probe 50 from its equilibrium position, m is the mass of the lever, $\gamma$ is its dissipation, k is its spring constant, $\epsilon_0$ is the vacuum permittivity, A is the area of probe 50, V is the probe-sample voltage.

Developing the driving force around the equilibrium position $U_o$ results in:

$$m\ddot{x} + \gamma \dot{x} + k x = \frac{\epsilon_0 A}{U_0^2} V(t)^2 \left(1 - \frac{2x}{U_0} + \frac{3x^2}{U_0^2} - \ldots \right) \quad (2)$$

The differential force with respect to the probe height is given by:

$$\frac{\partial F}{\partial z} = \epsilon_0 \frac{A}{z^3} V^2. \quad (3)$$

With an average change in voltage of 1 millivolt, nominal probe height of 100 angstroms, and a probe radius of 1 micron, a gradient force of $10^5$–N/m can be obtained.

To demonstrate how the scanning force microscope of the present invention functions as a correlator, we solve (2) with the following excitation:

$$V_f(t) = \sum_{n=0}^{N} \delta(t - nT), \quad (4)$$

$$V_s(t - \tau) = \sum_{n=0}^{N} \delta(t - \tau - nT)$$

T is the separation between adjacent pulses and NT is the time of integration of the detector. The probe-sample bias is: $V(t) = V_f(t) + V_s(t-\tau)$. The 0-order solution taking only the first term in equation (2) is given by:

$$x(t) = \sum_{n=0}^{N} x_\delta(t - nT) + \sum_{n=0}^{N} x_\delta(t - \tau - nT) + \quad (5)$$

-continued $$\begin{cases} 2 \sum_{n=0}^{N} x_\delta(t - nT) & \tau = 0 \\ 0 & \tau \neq 0 \end{cases}$$

with:

$$x_\delta(t) = \left(C_1 - \frac{1}{\sqrt{\gamma^2 - 4km}} \Theta(t)\right) e^{-\left(\frac{\gamma + \sqrt{\gamma^2 - 4km}}{2m}\right)t} + \quad (6)$$

$$\left(C_2 + \frac{1}{\sqrt{\gamma^2 - 4km}} \Theta(t)\right) e^{-\left(\frac{\gamma - \sqrt{\gamma^2 - 4km}}{2m}\right)t}$$

As can be seen from (5) and (6), the probe deviation when $\tau$ is equal to zero is twice as big as the deviation when $\tau$ is not equal to zero, and if plotted as a function of time delay will exhibit a peak at $\tau = 0$.

Thus, in the present claimed invention, because of the nonlinear nature of the probe to sample response, the probe-sample response signal can be measured over a range of time delays to obtain a cross-correlation of the probe-sample response signal. Thereby allowing for a cross-correlation to be performed such that simultaneous subpicosecond-time resolution and submicron-spatial resolution are achieved.

Therefore, the present claimed invention provides an improved microscopy technique in which simultaneous subpicosecond-time resolution and submicron-spatial resolution are achieved.

The foregoing descriptions of specific embodiments of the present invention have been presented for the purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. An ultrafast scanning probe microscopy method having simultaneous subpicosecond-temporal resolution and submicron-spatial resolution comprising the steps of:

generating a first short optical pulse,
generating a second short optical pulse,
generating a variable time delay between said first and second short optical pulses,
directing said first short optical pulse at an observation sample, said observation sample disposed proximate to a probe of a scanning probe microscope, said scanning probe microscope producing a probe-sample response signal indicative of a response of said probe of said scanning probe microscope to characteristics of said sample,
modulating said probe of said scanning probe microscope with said second short optical pulse,
varying said time delay between said first and second short optical pulses such that a plurality of differing delay times are produced between said first and second short optical pulses, recording said probe-sample response signal at each of said plurality of differing time delays, performing a cross-correlation on said probe-sample response signal, such that simultaneous subpicosecond-temporal resolution and submicron-spatial resolution of said sample are obtained.

2. The ultrafast scanning probe microscopy method as recited in claim 1 wherein said steps of generating said first and second short optical pulses and generating a variable time delay between said first and second short optical pulses further comprises:

generating a single short optical pulse, splitting said single short optical pulse such that said first and second short optical pulses are produced, delaying one of said first and second short optical pulses using variable time delay means such that a variable time delay exists between said first and second short optical pulses.

3. The ultrafast scanning probe microscopy method as recited in claim 1 wherein said first and second optical pulses are generated using a short pulse mode locked laser.

4. The ultrafast scanning probe microscopy method as recited in claim 1 wherein said first and second optical pulses are generated using a colliding pulse mode locking dye laser.

5. The ultrafast scanning probe microscopy method as recited in claim 1 wherein said first and second optical pulses are generated using a solid state mode-locked laser.

6. The ultrafast scanning probe microscopy method as recited in claim 1 wherein said first and second optical pulses are generated using a titanium/sapphire laser.

7. The ultrafast scanning probe microscopy method as recited in claim 1 wherein said scanning probe microscope comprises a scanning tunneling microscope.

8. The ultrafast scanning probe microscopy method as recited in claim 1 wherein said scanning probe microscope comprises a scanning force microscope.

9. The ultrafast scanning probe microscopy method as recited in claim 1 wherein said scanning probe microscope comprises a near field scanning optical microscope.

10. The ultrafast scanning probe microscopy method as recited in claim 1 wherein said step of modulating said probe of said scanning probe microscope with said second short optical pulse comprises gating said scanning probe microscope by directing said second short optical pulse onto a photoconductive switch disposed on said scanning probe microscope.

11. The ultrafast scanning probe microscopy method as recited in claim 1 wherein said step of modulating said probe of said scanning probe microscope with said second short optical pulse comprises directing said second short optical pulse onto said probe of said scanning probe microscope.

12. An ultrafast scanning probe microscopy method having simultaneous subpicosecond-temporal resolution and submicron-spatial resolution comprising the steps of:

generating a single short optical pulse, splitting said single short optical pulse such that first and second short optical pulses are produced, delaying one of said first and second short optical pulses using variable time delay means such that a variable time delay exists between said first and second short optical pulses.

directing said first short optical pulse at an observation sample, said observation sample disposed proximate to a probe of a scanning probe microscope, said scanning probe microscope producing a probe-sample response signal indicative of a response of said probe of said scanning probe microscope to characteristics of said sample, gating said scanning probe microscope by directing said second short optical pulse onto a photoconductive switch disposed on said scanning probe microscope, varying said time delay between said first and second short optical pulses such that a plurality of differing delay times are produced between said first and second short optical pulses, recording said probe-sample response signal at each of said plurality of differing time delays, performing a cross-correlation on said probe-sample response signal, such that simultaneous subpicosecond-temporal resolution and submicron-spatial resolution of said sample are obtained.

13. The ultrafast scanning probe microscopy method as recited in claim 12 wherein said first and second optical pulses are generated using a short pulse mode locked laser.

14. The ultrafast scanning probe microscopy method as recited in claim 12 wherein said first and second optical pulses are generated using a colliding pulse mode locking dye laser.

15. The ultrafast scanning probe microscopy method as recited in claim 12 wherein said first and second optical pulses are generated using a solid state laser.

16. The ultrafast scanning probe microscopy method as recited in claim 12 wherein said first and second optical pulses are generated using a titanium/sapphire laser.

17. The ultrafast scanning probe microscopy method as recited in claim 12 wherein said scanning probe microscope comprises a scanning tunneling microscope.

18. The ultrafast scanning probe microscopy method as recited in claim 12 wherein said scanning probe microscope comprises a scanning force microscope.

19. The ultrafast scanning probe microscopy method as recited in claim 12 wherein said scanning probe microscope comprises a near field scanning optical microscope.

20. An ultrafast scanning probe microscopy method having simultaneous subpicosecond-temporal resolution and submicron-spatial resolution comprising the steps of:

generating a single short electromagnetic pulse, splitting said single short electromagnetic pulse such that first and second short electromagnetic pulses are produced, delaying one of said first and second short electromagnetic pulses using variable time delay means such that a variable time delay exists between said first and second short electromagnetic pulses.

directing said first short electromagnetic pulse at an observation sample, said observation sample disposed proximate to a probe of a scanning probe microscope, said scanning probe microscope producing a probe-sample response signal indicative of a response of said probe of said scanning probe microscope to characteristics of said sample, gating said scanning probe microscope by directing said second short electromagnetic pulse onto a gating switch disposed on said scanning probe microscope, varying said time delay between said first and second electromagnetic pulses such that a plurality of differing delay times are produced between said first and second short electromagnetic pulses, recording said probe-sample response signal at each of said plurality of differing time delays, performing a cross-correlation on said probe-sample response signal, such that simultaneous subpicosecond-temporal resolution and submicron-spatial resolution of said sample are obtained.

21. The ultrafast scanning probe microscopy method as recited in claim 20 wherein said scanning probe microscope comprises a scanning tunneling microscope.

22. The ultrafast scanning probe microscopy method as recited in claim 20 wherein said scanning probe microscope comprises a scanning force microscope.

23. The ultrafast scanning probe microscopy method as recited in claim 20 wherein said scanning probe microscope comprises a near field scanning optical microscope.

24. The ultrafast scanning probe microscopy method as recited in claim 20 wherein said step of modulating said probe of said scanning probe microscope with said second short electromagnetic pulse comprises gating said scanning probe microscope by directing said second short electromagnetic pulse onto a gating switch disposed on said scanning probe microscope.

25. The ultrafast scanning probe microscopy method as recited in claim 20 wherein said step of modulating said probe of said scanning probe microscope with said second short electromagnetic pulse comprises directing said second short electromagnetic pulse onto said probe of said scanning probe microscope.

26. An ultrafast scanning probe microscopy method having simultaneous subpicosecond-temporal resolution and submicron-spatial resolution comprising the steps of:

generating a first excitation pulse,
generating a second excitation pulse,
generating a variable time delay between said first and second excitation pulses, exciting an observation sample with a first excitation pulse, said observation sample disposed proximate to a probe of a scanning probe microscope, said scanning probe microscope producing a probe-sample response signal indicative of a response of said probe of said scanning probe microscope to characteristics of said sample, modulating said probe of said scanning probe microscope with said second excitation pulse, varying said time delay between said first and second excitation pulses such that a plurality of differing delay times are produced between said first and second excitation pulses, recording said probe-sample response signal at each of said plurality of differing time delays, performing a cross-correlation on said probe-sample response signal, such that simultaneous subpicosecond-temporal resolution and submicron-spatial resolution of said sample are obtained.

27. The ultrafast scanning probe microscopy method as recited in claim 26 wherein said first excitation pulse is an optical pulse.

28. The ultrafast scanning probe microscopy method as recited in claim 26 wherein said first excitation pulse is an electrical pulse.

29. The ultrafast scanning probe microscopy method as recited in claim 26 wherein said first excitation pulse is an acoustical pulse.

30. The ultrafast scanning probe microscopy method as recited in claim 26 wherein said second excitation pulse is an optical pulse.

31. The ultrafast scanning probe microscopy method as recited in claim 26 wherein said second excitation pulse is an electrical pulse.

32. The ultrafast scanning probe microscopy method as recited in claim 26 wherein said second excitation pulse is an acoustical pulse.

33. An ultrafast scanning probe microscopy method having simultaneous subpicosecond-temporal resolution and submicron-spatial resolution comprising the steps of:

using a probe of a scanning probe microscope to generate a first excitation pulse, using said probe to generate a second excitation pulse, generating a variable time delay between said first and second excitation pulses, exciting an observation sample with said first excitation pulse, said observation sample disposed proximate to said probe of a scanning probe microscope, said scanning probe microscope producing a probe-sample response signal indicative of a response of said probe of said scanning probe microscope to characteristics of said sample, modulating said probe of said scanning probe microscope with said second excitation pulse, varying said time delay between said first and second excitation pulses such that a plurality of differing delay times are produced between said first and second excitation pulses, recording said probe-sample response signal at each of said plurality of differing time delays, performing a cross-correlation on said probe-sample response signal, such that simultaneous subpicosecond-temporal resolution and submicron-spatial resolution of said sample are obtained.

34. An ultrafast scanning probe microscopy method having simultaneous subpicosecond-temporal resolution and submicron-spatial resolution comprising the steps of:

using a first probe of a scanning probe microscope to generate a first excitation pulse, using a second probe of a scanning probe microscope to generate a second excitation pulse, generating a variable time delay between said first and second excitation pulses, exciting an observation sample with said first excitation pulse generated by said first probe, said observation sample disposed proximate to said first and second probes of said scanning probe microscopes, said second probe detecting a probe-sample response signal indicative of a response of said second probe to characteristics of said sample, varying said time delay between said first and second excitation pulses such that a plurality of differing delay times are produced between said first and second excitation pulses, recording said probe-sample response signal at each of said plurality of differing time delays, performing a cross-correlation on said probe-sample response signal, such that simultaneous subpicosecond-temporal resolution and submicron-spatial resolution of said sample are obtained.

* * * * *